(12) United States Patent
Ben Himane (10) Patent No.: US 9,111,347 B2
(45) Date of Patent: Aug. 18, 2015

(54) METHOD FOR DETERMINING THE POSE OF A CAMERA WITH RESPECT TO AT LEAST ONE REAL OBJECT

(75) Inventor: Mohammed Selim Ben Himane, Munich (DE)

(73) Assignee: Metaio GmbH, Munich (DE)

( * ) Notice: Subject to any disclaimer, the term of this patent is extended or adjusted under 35 U.S.C. 154(b) by 757 days.

(21) Appl. No.: 13/380,421

(22) PCT Filed: Jul. 29, 2009

(86) PCT No.: PCT/EP2009/005495
§ 371 (c)(1),
(2), (4) Date: Dec. 22, 2011

(87) PCT Pub. No.: WO2011/012142
PCT Pub. Date: Feb. 3, 2011

(65) Prior Publication Data
US 2012/0120199 A1    May 17, 2012

(51) Int. Cl.
*H04N 13/02*    (2006.01)
*G06T 7/00*    (2006.01)

(52) U.S. Cl.
CPC ..... *G06T 7/0046* (2013.01); *G06T 2207/30244* (2013.01)

(58) Field of Classification Search
CPC .............. G06T 2207/30244; G06T 7/0046; G06T 7/0042; G06K 9/3208; G06K 9/3216
See application file for complete search history.

(56) References Cited

U.S. PATENT DOCUMENTS

| 5,850,469 A | 12/1998 | Martin et al. |
| 7,023,536 B2 | 4/2006 | Zhang et al. |

(Continued)

OTHER PUBLICATIONS

Gabriele Bleser et al: "Online camera pose estimation in partially known and dynamic scenes" Mixed and Augmented Reality, 2006. International Symposium, p. 56-65.

(Continued)

*Primary Examiner* — Tat Chio
(74) *Attorney, Agent, or Firm* — O'Shea Getz P.C.

(57) ABSTRACT

A method for determining the pose of a camera with respect to at least one real object, the method comprises the following steps: operating the camera (1) for capturing a 2-dimensional (or 3-dimensional) image (4) including at least a part of the real object (3), providing a transformation matrix (T) which includes information regarding a correspondence between 3-dimensional points (Pi*) associated with the real object (3) and corresponding 2-dimensional points (or 3-dimensional points) (p,) of the real object (5) as included in the 2-dimensional (or 3-dimensional) image (4), and determining an initial estimate of the transformation matrix (Tl) as an initial basis for an iterative minimization process used for iteratively refining the transformation matrix, determining a Jacobian matrix (J) which includes information regarding the initial estimate of the transformation matrix (Tl) and reference values of 3-dimensional points (Pi*) associated with the real object (3). Further, in the iterative minimization process, in each one of multiple iteration loops determining a respective updated version of the transformation matrix (T) based on a respective previous version of the transformation matrix (T) and based on the Jacobian matrix (J), wherein the Jacobian matrix is not updated during the iterative minimization process, and determining the pose of the camera (1) with respect to the real object (3) using the transformation matrix (T) determined at the end of the iterative minimization process. As a result, the camera pose can be calculated with rather low computational time.

18 Claims, 11 Drawing Sheets

(56) References Cited

U.S. PATENT DOCUMENTS

| | | | |
|---|---|---|---|
| 7,038,846 B2 | 5/2006 | Mandella | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl | |
| 7,268,956 B2 | 9/2007 | Mandella | |
| 7,474,809 B2 | 1/2009 | Carl et al. | |
| 7,729,515 B2 | 6/2010 | Mandella et al. | |
| 7,826,641 B2 | 11/2010 | Mandella et al. | |
| 7,961,909 B2 | 6/2011 | Mandella et al. | |
| 2005/0168437 A1 | 8/2005 | Carl et al. | |
| 2005/0253871 A1 | 11/2005 | Anabuki et al. | |
| 2005/0261573 A1* | 11/2005 | Satoh et al. | 600/415 |
| 2007/0009135 A1* | 1/2007 | Ishiyama | 382/103 |
| 2011/0227915 A1 | 9/2011 | Mandella et al. | |
| 2012/0038549 A1 | 2/2012 | Mandella et al. | |
| 2013/0194418 A1 | 8/2013 | Gonzalez-Banos et al. | |

OTHER PUBLICATIONS

Selim Benhimane et al: "Integration of Euclidean constraints in template based visual tracking or piecewiese-planar", Intelligent Robots and Systems, 2006, p. 1218-1223.

Jorge Batista et al: "Interactive Multistep Explicit Camera Calibration", IEEE Transactions on Robotics and Automation, 1999, New York.

David G. Lowe: "Distinctive Image Features from Scale-Invariant Keypoints In: International Journal of Computer Vision", vol. 60, Nr. 2, pp. 91-110, 2004.

V. Lepetit and P. Fua, Keypoint Recognition using Randomized Trees. IEEE Transactions on Pattern Analysis and Machine Intelligence, vol. 28, Nr. 9, pp. 1465-1479, 2006.

Richard Hartley and Andrew Zisserman, Multiple View Geometry in Computer Vision, Cambridge University press, second edition, 2003 (see for example Chapter 3, pp. 65-86.

Richard Hartley and Andrew Zisserman, Multiple View Geometry in Computer Vision, Cambridge University press, second edition, 2003 (see for example Chapter 6, pp. 153-177.

P. Gill, W. Murray and M. Wright: "Practical Optimization", Academic Press, pp. 134-137, 1981.

Richard Hartley and Andrew Zisserman, "Multiple View Geometry in Computer Vision", Cambridge University press, second edition, 2003 (see for example Chapter 7, pp. 178-194.

Tracking people with twists and exponential Maps, Bregler and Malik, in IEEE (CVPR), Santa Barbara, p. 8-15, 1998.

Real-Time Visual Tracking of Complex Structures, Tom Drummond et al, Transactions on Pattern Analysis and Machine Intelligence, vol. 24, No. 7, p. 932-946, 2002.

Motilal Agrawal, A Lie Algebraic Approach for Consistent Pose Registration for General Euclidean Motion, International Conference in Computer Vision, pp. 1891-1897, 2005.

Lucas Kanade 20 Years On: A Unifying Framework, Simon Baker and Iain Matthews, International Journal of Computer Vision, vol. 56, No. 3, pp. 221-255, 2004.

* cited by examiner

Set of equations $m_i \times L P_i^* = 0$ (x is the cross product):

$$\begin{bmatrix} 0 & 0 & 0 & -X_i^* & -Y_i^* & -Z_i^* & y_i X_i^* & y_i Y_i^* & y_i Z_i^* \\ X_i^* & Y_i^* & Z_i^* & 0 & 0 & 0 & -x_i X_i^* & -x_i Y_i^* & -x_i Z_i^* \\ -y_i X_i^* & -y_i Y_i^* & -y_i Z_i^* & x_i X_i^* & x_i Y_i^* & x_i Z_i^* & 0 & 0 & 0 \end{bmatrix} \begin{bmatrix} a_1 \\ a_2 \\ a_3 \\ b_1 \\ a_4 \\ a_5 \\ a_6 \\ b_2 \\ a_7 \\ a_8 \\ a_9 \\ b_3 \end{bmatrix} = \begin{bmatrix} 0 \\ 0 \\ 0 \end{bmatrix}$$

Which can be written as $C_i\, l = 0$ where $$C_i = \begin{bmatrix} 0 & 0 & 0 & -X_i^* & -Y_i^* & -Z_i^* & y_i X_i^* & y_i Y_i^* & y_i Z_i^* \\ X_i^* & Y_i^* & Z_i^* & 0 & 0 & 0 & -x_i X_i^* & -x_i Y_i^* & -x_i Z_i^* \\ -y_i X_i^* & -y_i Y_i^* & -y_i Z_i^* & x_i X_i^* & x_i Y_i^* & x_i Z_i^* & 0 & 0 & 0 \end{bmatrix}$$

And $l = [a_1\ a_2\ a_3\ b_1\ a_4\ a_5\ a_6\ b_2\ a_7\ a_8\ a_9\ b_3]$

METHOD FOR DETERMINING THE POSE OF A CAMERA WITH RESPECT TO AT LEAST ONE REAL OBJECT

This application is entitled to the benefit of, and incorporates by reference essential subject matter disclosed in PCT Application No. PCT/EP2009/005495 filed on Jul. 29, 2009.

BACKGROUND OF THE INVENTION

1. Technical Field

The present invention relates to a method for determining the pose of a camera with respect to at least one real object. A camera is operated for capturing a 2-dimensional image including at least a part of a real object, and in the determination process, the pose of the camera with respect to the real object is determined using correspondences between 3-dimensional points associated with the real object and corresponding 2-dimensional points of the real object in the 2-dimensional image.

2. Background Information

Augmented Reality Systems permit the superposition of computer-generated virtual information with visual impressions of the real environment. To this end, the visual impressions of the real world are mixed with virtual information, e.g. by means of semi-transmissive data glasses or by means of a head-mounted display worn on the head of a user. The blending-in of virtual information or objects can be effected in context-dependent manner, i.e. matched to and derived from the respective environment viewed. As virtual information, it is basically possible to use any type of data, such as texts, images etc. The real environment is detected e.g. with the aid of a camera carried on the head of the user.

When the person using an augmented reality system turns his or her head, tracking of the virtual objects is necessary with respect to the changing field of view. The real environment may be a complex apparatus, and the object detected can be a significant part of the apparatus. During a so-called tracking process, the real object (which may be an object to be observed such as an apparatus, an object provided with a marker to be observed, or a marker placed in the real world for tracking purposes) detected during initialization serves as a reference for computing the position at which the virtual information is to be displayed or blended-in in an image or picture taken up by the camera. For this purpose, it is necessary to determine the pose of the camera with respect to the real object. Due to the fact that the user (and consequently the camera when it is carried by the user) may change his or her position and orientation, the real object has to be subjected to continuous tracking in order to display the virtual information at the correct position in the display device also in case of an altered pose (position and orientation) of the camera. The effect achieved thereby is that the information, irrespective of the position and/or orientation of the user, is displayed in the display device in context-correct manner with respect to reality.

One of the problems in the field of augmented reality is the determination of the head position and the head orientation of the user by means of a camera that is somehow associated with the user's head. Another problem may be determining the position and orientation of the camera inside a mobile phone in order to overlay information on the camera image and show the combination of both on the phone's display. To this end, in some applications the pose of the camera with respect to at least one real object of the captured real environment is estimated using the video flow or image flow of the camera as source of information.

Pose estimation is one of the most basic and most important tasks in Computer Vision and in Augmented Reality. In most real-time applications, it needs to be solved in real-time. However, since it involves a non-linear minimization problem, it requires heavy computational time.

SUMMARY OF THE INVENTION

It is therefore an object of the present invention to provide a method for determining the pose of a camera with respect to at least one real object which is capable to be computed by a data processing means with rather low computational time.

The invention is directed to a method for determining the pose of a camera with respect to at least one real object according to the features of claim 1. Further, the invention is directed to a computer program product as claimed in claim 12.

According to an aspect, the invention concerns a method for determining the pose of a camera with respect to at least one real object, the method comprising the steps of:

operating the camera for capturing a 2-dimensional (or 3-dimensional) image including at least a part of a real object, providing correspondences between 3-dimensional points associated with the real object and 2-dimensional (or 3-dimensional) points of the real object in the 2-dimensional (or 3-dimensional, respectively) image; for example, the coordinates of the 3D points may be measured on the real object or come from the 2D technical drawing of the real object or are determined thanks to a 3D CAD model of the object, while the 2D points coordinates may generally be determined thanks to some standard image processing techniques such as feature points extraction (corner points, edge points, scale invariant points, etc.), determining an initial estimate of the transformation matrix (that will be later used to determine the pose) as an initial basis for an iterative minimization process used for iteratively refining the transformation matrix, determining a Jacobian matrix which includes information regarding the initial estimate of the transformation matrix and reference values of 3-dimensional points coordinates associated with the real object; for example, the Jacobian matrix may be estimated numerically using for example the finite difference method or analytically by assuming a certain camera projection model (in our case we determine it analytically assuming the pinhole camera model), in the iterative minimization process, in each one of multiple iteration loops determining a respective updated version of the transformation matrix based on a respective previous version of the transformation matrix and based on the Jacobian matrix, wherein the Jacobian matrix is not updated during the iterative minimization process, and determining the pose of the camera with respect to the real object using the transformation matrix determined at the end of the iterative minimization process.

In an embodiment of the invention, the iterative minimization process involves the algorithm of Gauss-Newton or the algorithm of Levenberg-Marquardt.

In a further embodiment of the invention, the iterative minimization process involves a compositional update process in which the respective updated version of the transformation matrix is computed from a multiplication between a matrix built with update parameters of the respective previous transformation matrix and the respective previous transformation matrix.

In a further embodiment, Lie Algebra parameterization is used in the iterative minimization process.

Further embodiments of the invention are set forth in the dependent claims.

BRIEF DESCRIPTION OF THE DRAWINGS

Aspects of the invention will be discussed in more detail in the following by way of the Figures illustrating embodiments of the invention, in which.

DETAILED DESCRIPTION OF THE INVENTION

Figure 1:
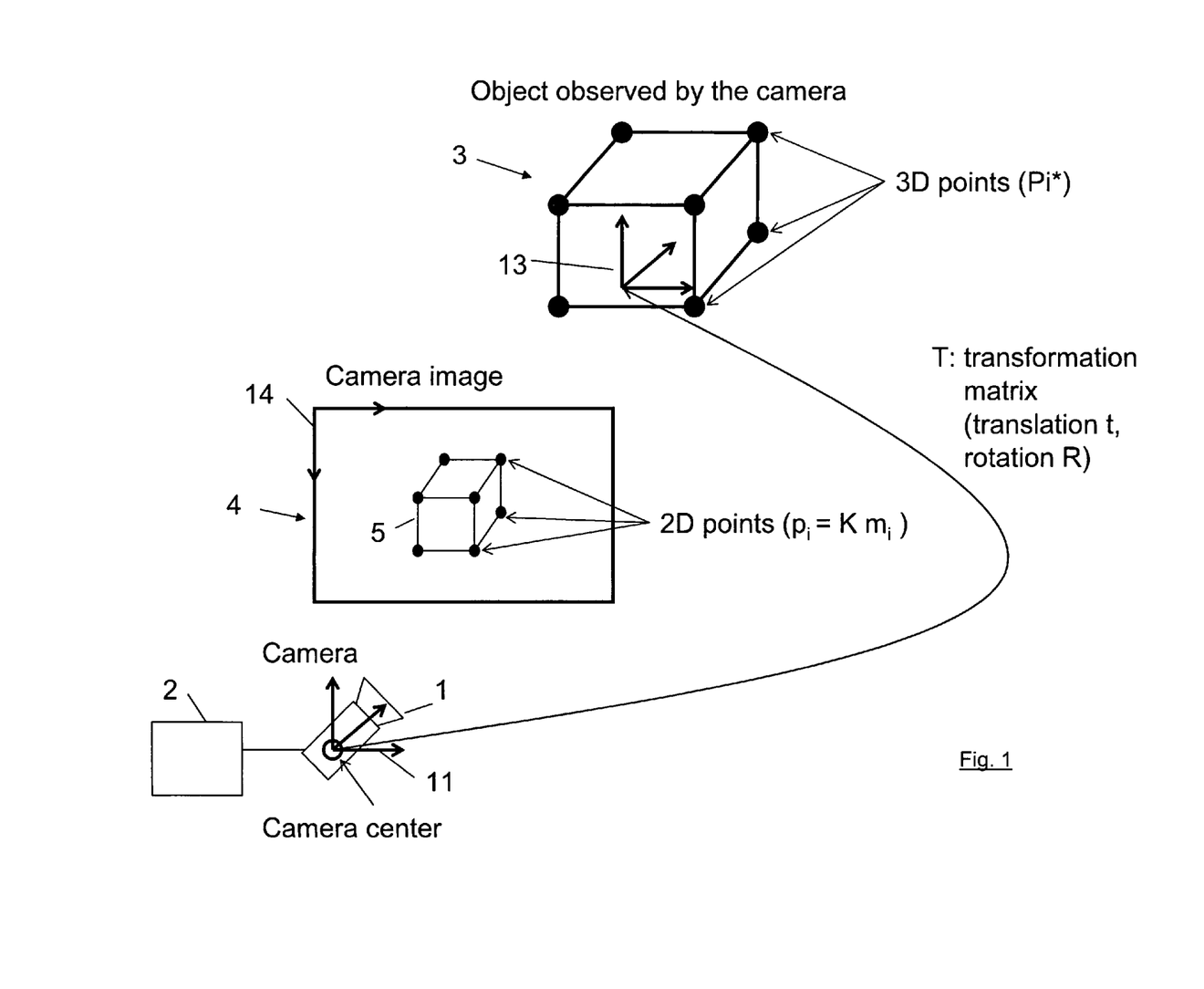
FIG. 1 shows a schematic visualization of a scene comprising a real object observed by a camera and a camera image displaying a 2-dimensional representation of the real object.

FIG. 1 shows a schematic visualization of a scene comprising any kind of a real object 3 (in the present example in the form of a cube) comprising 3D points Pi* which is observed by a camera 1. The camera 1 is coupled with a data processing means 2, which may be any kind of computational processor which is appropriate for processing digital images provided by the camera 1. For example, the camera 1 and the processor 2 may be included in the same device, such as a mobile telephone or any other mobile device, or may be incorporated in respective distributed devices coupled in wired or wireless manner. The camera generates one or more camera images 4 displaying a 2-dimensional representation 5 of the real object 3 having 2D points pi. The representation of the object in the image is not restricted to the appearance of the object as a photometric response to the light of the visible spectrum reflected from the object (which corresponds to the standard image acquired by standard commercial cameras). The representation of the object can also be its response to other portions of the electromagnetic light. It can also be for example an image obtained with infrared camera, thermal camera or even a Time Of Flight (TOF) camera. In the case of Time Of Flight camera, the depth of the image points can be directly measured: these cameras emit a modulated infrared light and deliver an amplitude image (which is the amplitude of the reflected signal at every pixel) and a distance image (which is the phase shift between the emitted and the reflected signal). Another camera system may combine 2 cameras to acquire an image including 3D depth information. Also other systems are imaginable, which provide image information combined with 3D or depth-data (e.g. a combination of a TOF-camera and a color camera or a color camera with a laser-scanner).

In this way, an appropriate camera may capture a 3-dimensional image and a transformation matrix may be provided which includes information regarding a correspondence between 3-dimensional points associated with the real object and corresponding 3-dimensional points of the real object as included in the 3-dimensional image.

In a tracking process, the aim is to determine the pose of the camera 1 with respect to the real object 3, the pose being computed using the transformation matrix T between the camera coordinate system 11 and the world coordinate system 13 associated with the real object 3. The information thus obtained serves as reference for computing the position at which virtual information is to be displayed or blended-in in an image 4 taken up by the camera. Continuous tracking of the real object 3 is performed when the relative position and/or orientation between the user or the camera 1 and the real object 3 changes.

Given the coordinates of the set of 3D points Pi* (expressed in the world coordinate system 13, for the sake of simplicity, in the FIG. 1 the world coordinate system is chosen superimposed with the real object coordinate system) and the coordinates of their 2D projections $p_i$ in the image (expressed in the image coordinate system 14), the objective is to determine the camera pose in the world coordinate system 13: the position and the orientation of the camera 1 in the world coordinate system 13. With a Time Of Flight camera or stereo camera, it is possible to get the depth of the 2D projections, one then has access to the complete 3D coordinates of the considered points in the coordinate system attached to the camera.

The coordinates of the 3D points Pi* can for example be manually measured on the real object or coming from the 2D technical drawing of the real object or determined thanks to 3D CAD model of the object. While the 2D point coordinates $p_i$ are generally determined thanks to some standard image processing techniques such as feature extraction (corner points, edge points, scale invariant points, etc . . . ). The correspondences between the Pi* and $p_i$ are obtained thanks to standard computer vision method generally based on geometric properties of the 3D points and the use of special geometric spatial distribution of the points and their neighborhood. It can also be based on some knowledge of the appearance of the 3D points in the image based on a manually labeled set of images called keyframes (one then have different possible appearance of the object and the 3D points lying on it in images acquired under different viewpoints). In that case, approaches using for example descriptors (e.g. David G. Lowe: "Distinctive Image Features from Scale-Invariant Keypoints In: International Journal of Computer Vision", Vol. 60, Nr. 2, pages 91-110, 2004) or classifiers (e.g. V. Lepetit and P. Fua, Keypoint Recognition using Randomized Trees.

IEEE Transactions on Pattern Analysis and Machine Intelligence, Vol. 28, Nr. 9, pages 1465-1479, 2006) could be used to establish the correspondences. For example, correspondences between the 3D points and 2D points are established between the real object and the keyframes (2D⇆3D). In order to establish the correspondences between the real object and the image in hand (image 4), only 2D⇆2D correspondences are then needed. In case, a textured 3D CAD model of the object is available, it can be used during the process of determining the correspondences for example by synthetically generating the keyframe images instead of acquiring them with a camera.

The position of the camera is also called translation of the camera and it can be represented using a (3×1) vector t as known by the skilled person. The orientation of the camera is also called rotation of the camera and it can be represented with a (3×3) rotation matrix R as also known by the skilled person. The rotation matrix R is a matrix that belongs to the so-called Special Orthogonal group SO(3) which is known to the person skilled in the art. The SO(3) group is the group of (3×3) matrices verifying: $R^T R = Id$ and $\det(R)=1$, Id is the identity matrix (which is a (3×3) matrix with ones on the main diagonal and zeros elsewhere and det stands for the determinant of the matrix).

The camera pose in the world coordinate system 13 can be written using a (4×4) matrix $$T = \begin{bmatrix} R & t \\ 0 & 1 \end{bmatrix}$$

This matrix T is called the transformation matrix and it is in the Special Euclidean group SE(3). It has 6 degrees of freedom: 3 degrees of freedom for the translation and 3 degrees of freedom for the rotation.

The above is basically known to the skilled person and is described in, e.g., "Richard Hartley and Andrew Zisserman, Multiple View Geometry in Computer Vision", Cambridge University press, second edition, 2003 (see for example Chapter 3, pages 65-86).

The image projection can be summarized as follows:

At a certain pose T of the camera, a 3D point $Pi^* = [Xi^*, Yi^*, Zi^*, 1]$ expressed in the world coordinate system 13 (where $Xi^*$ is the coordinate along the x-axis, $Yi^*$ is the coordinate along the y-axis and $Zi^*$ is the coordinate along the z-axis) is first projected on the normalized plane as a "normalized" points $m_i = [xi, yi, 1] = [Xi/Zi, Yi/Zi, 1]$ where $[Xi, Yi, Zi, 1] = T[Xi^*, Yi^*, Zi^*, 1]$, and where xi, yi are the coordinates of the 2D point in the normalized plane. The normalized plane is the plane orthogonal to the z-axis of the camera coordinate system (corresponding to the optical axis of the camera) and the distance between this plane and the optical center of the camera is 1 distance unit. It is only a mathematical concept allowing the expression of the point coordinates as a simple projection of the 3D points without the need of the camera intrinsic parameters (see below). With a Time Of Flight camera or a stereo-camera, it is possible to get the 3D coordinates of the transformed points in the coordinate system attached to the camera, i.e. it is possible to measure directly $[Xi, Yi, Zi, 1]$.

Then $m_i$ is projected into the camera image as $p_i = [ui, vi, 1] = K \, m_i$ where the matrix K is the (3×3) camera intrinsic parameter matrix $$K = \begin{bmatrix} fx & s & u0 \\ 0 & fy & v0 \\ 0 & 0 & 1 \end{bmatrix}$$

The parameters fx and fy are respectively the horizontal focal length on the x-axis and the vertical focal length on the y-axis, s is the skew (this parameter is different from 0 in case the pixel elements of the camera sensor array do not have perpendicular axes), u0 and v0 are the coordinates of the principal point in pixels in the image (the principal point is the intersection of the optical axis with the image plane). For more details, see "Richard Hartley and Andrew Zisserman, Multiple View Geometry in Computer Vision", Cambridge University press, second edition, 2003 (see for example Chapter 6, pages 153-177).

There is also the phenomenon of the camera distortion. Here, one will consider that the camera is calibrated and that the intrinsic parameters are known. The images are also considered undistorted.

Therefore, it is possible when having an image point $p_i = [ui, vi, 1]$ with coordinates expressed in an undistorted image to get its corresponding "normalized" point m, as follows: $m_i = K^{-1} p_i$. An illustration of the projection can be seen in FIG. 1.

From now on, instead of considering corresponding points $Pi^* \leftrightarrow p_i$, one will consider corresponding points: $Pi^* \leftrightarrow m_i$ since having $p_i$ allows to directly get $m_i$ using the formula above.

Having a set of corresponding 3D-2D points, the pose of the camera may be solved non-linearly using, for example, the algorithm of Gauss-Newton or using the algorithm of Levenberg-Marquardt, which are basically known to the skilled person and are described, e.g., in P. Gill, W. Murray and M. Wright: "Practical Optimization", Academic Press, pages 134-137, 1981.

Initial estimate of transformation matrix T

Both algorithms (Gauss-Newton or Levenberg-Marquardt) require an initial estimate Tl of the transformation matrix T (see the respective initial step in the processes as shown in FIGS. 2-5). The initial estimate Tl is used as an initial basis for the subsequent iterative minimization process for iteratively refining the initial transformation matrix Tl to a final transformation matrix T used for determining the camera pose.

Figure 11:
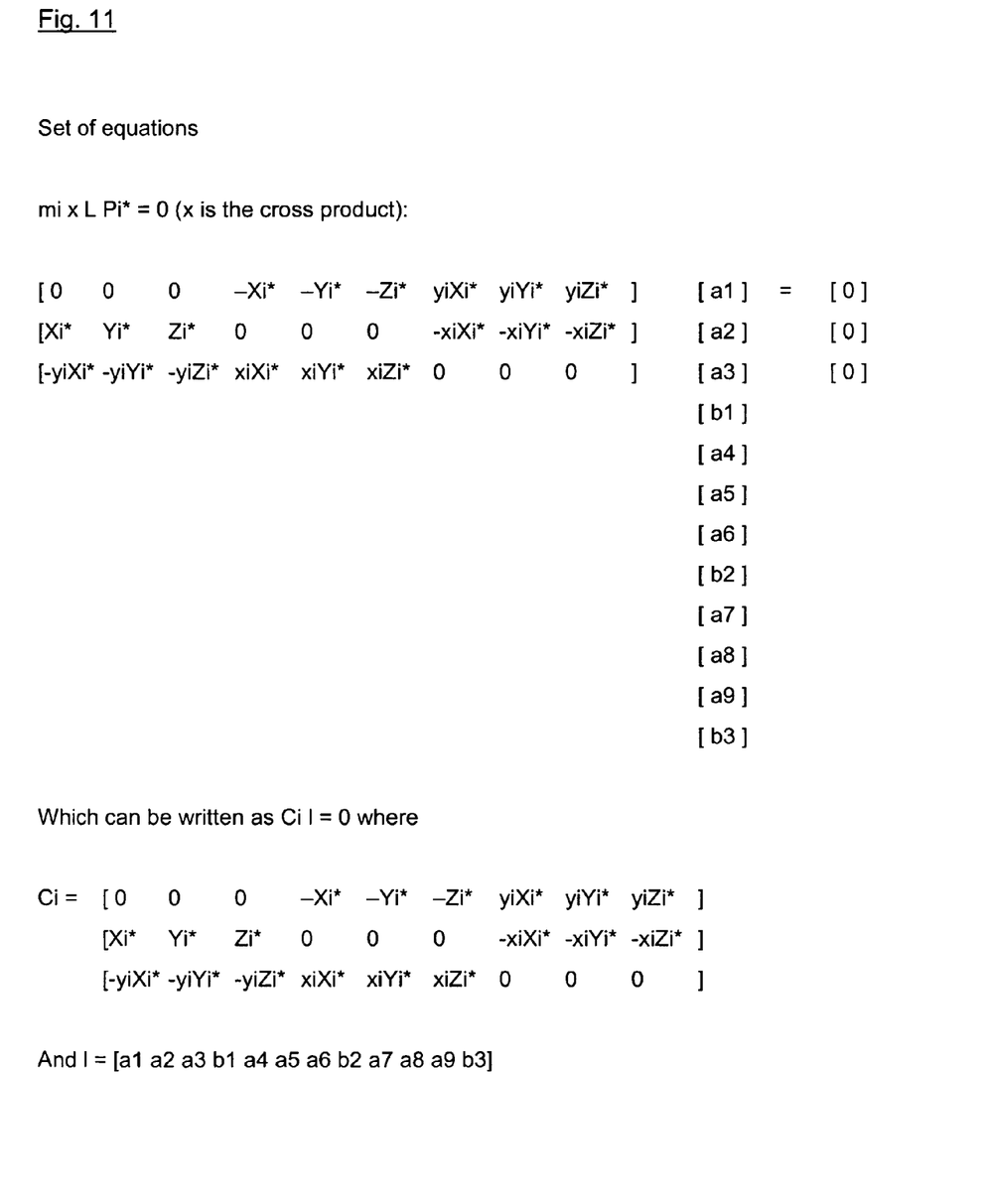
FIG. 11 shows a set of equations $m_i \times L\, Pi^* = 0$ as referred to in more detail below.

The following is an embodiment of how we obtain the initial estimate Tl of transformation matrix T:

Linearly solving for the matrix $L = \begin{bmatrix} a1 & a2 & a3 & b1 \\ a4 & a5 & a6 & b2 \\ a7 & a8 & a9 & b3 \end{bmatrix}$ Every correspondence $Pi^* \leftrightarrow m_i$ gives us a set of equations $m_i \times L \, Pi^* = 0$ (× is the cross product operator), as shown in FIG. 11.

It is then possible by stacking up all the Ci matrices to write the system as a linear problem $C \, l = 0$ where the unknown is the vector l (see FIG. 11).

In order to solve this problem, one can perform the SVD decomposition of the matrix as $C = Uc \, Sc \, Vc^T$, where Uc and Vc are two orthogonal matrices and Sc is diagonal matrix in which the entries of the diagonal correspond to the singular values of the matrix C. The last column of the matrix Vc corresponds to the least-square solution of the linear problem.

In order to have a better conditioning of the matrix C, one may first normalize the 3D points such that their mean is [0 0 0 1] and their standard deviation is sqrt(3) and one should normalize the 2D points such that their mean is [0 0 1] and their standard deviation is sqrt(2). After solving the system, then, one should de-normalize the obtained solution.

The above is basically known to the skilled person and is described in, e.g.: Richard Hartley and Andrew Zisserman, "Multiple View Geometry in Computer Vision", Cambridge University press, second edition, 2003 (see for example Chapter 7, pages 178-194).

When having 1 it is possible to build the matrix L. However, the matrix L is not guaranteed to be in SE(3) since the matrix $$A = \begin{bmatrix} a1 & a2 & a3 \\ a4 & a5 & a6 \\ a7 & a8 & a9 \end{bmatrix}$$

is not guaranteed to be a rotation matrix.

One can approximate the matrix A by a rotation matrix Ra as follows:

Perform the SVD decomposition of $A = Ua\, Sa\, Va^T$ (where again Ua and Va are orthogonal matrices and Sa is a diagonal matrix in which the diagonal entries correspond to the singular values of the matrix A)

$$Ra = Ua\, Da\, Va^T \text{ where } Da = \begin{bmatrix} 1 & 0 & 0 \\ 0 & 1 & 0 \\ 0 & 0 & \det(UaVa^T) \end{bmatrix}$$

The matrix Ra is a rotation matrix as it verifies $Ra\, Ra^T = Id$ and $\det(Ra) = 1$. The matrix The matrix $Tl = \begin{bmatrix} Ra & b \\ 0 & 1 \end{bmatrix}$ is a then a possible solution to the pose Tl.

This pose was first obtained through a linear system and then forcing the upper left (3×3) matrix to be a rotation matrix.

Non-linear iterative minimization process

Now, one has an initial estimate of the transformation matrix T and one is ready for a non-linear estimation. Both Gauss-Newton and Levenberg-Marquardt algorithms can be used. See the flow diagrams of FIGS. 2-4 for a general description of these algorithms.

Figure 2:
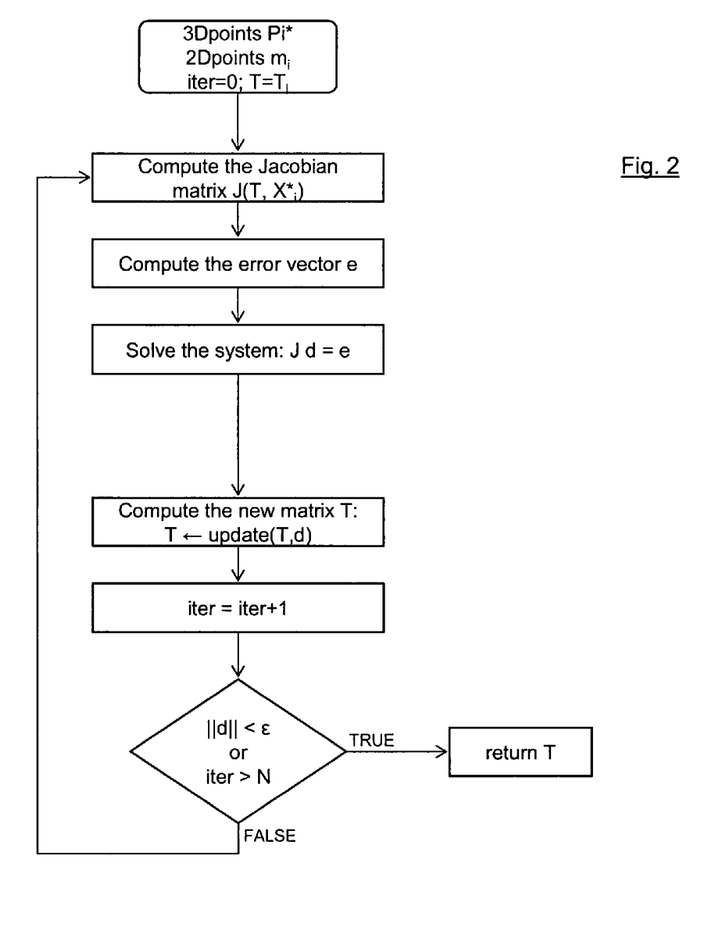
FIG. 2 shows a process according to the Gauss-Newton algorithm adapted for determining a transformation matrix T which is appropriate for determination of the pose of the camera according to FIG. 1.
Figure 3:
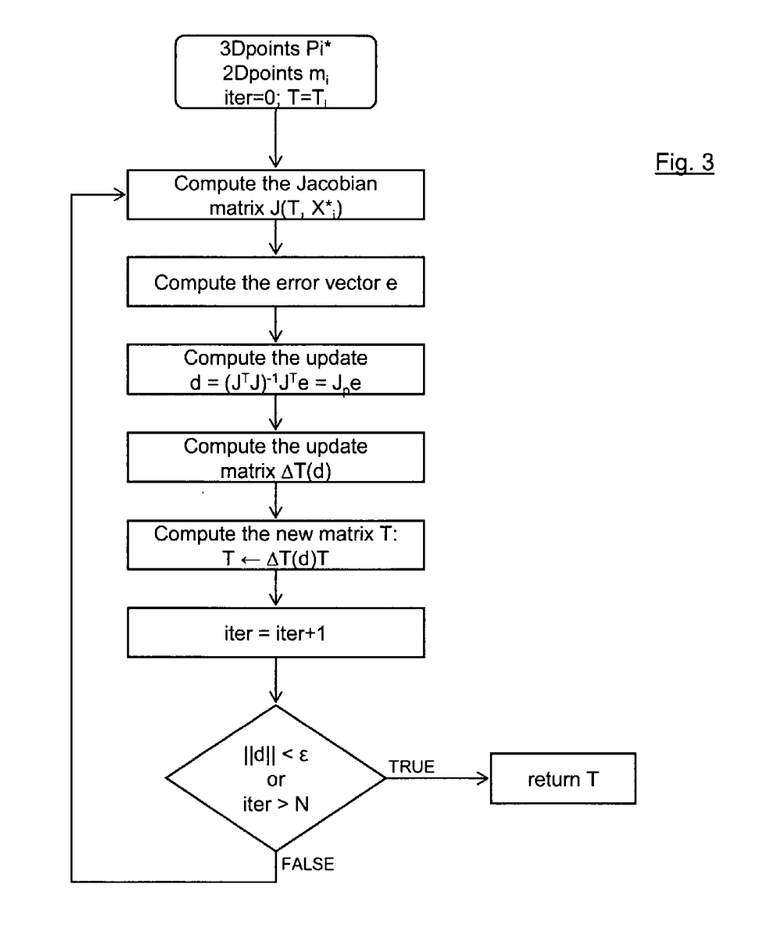
FIG. 3 shows a possible computational implementation of the process according to FIG. 2.

The standard Gauss-Newton implementation can be seen in FIG. 2. In FIG. 2, the task "Solve the system: J d=e" can be done in several ways. There are very efficient algorithms to find the vector d knowing the Jacobian matrix J and the error vector e. In FIG. 2, the task "Compute the new matrix T" depends on the parameterization and the update (as described in more detail below). Therefore, it can also be done with several ways. One possible implementation is depicted in FIG. 3. Here, the vector containing the update parameter is solved using the pseudo-inverse $J_p$ of the Jacobian matrix J: $J_p = (J^T J)^{-1} J^T$ and the update is done using a compositional approach, i.e. by building an update matrix $\Delta T(d)$ depending on the update parameter d and then by multiplying the old matrix T with the update matrix $\Delta T(d)$.

Figure 4:
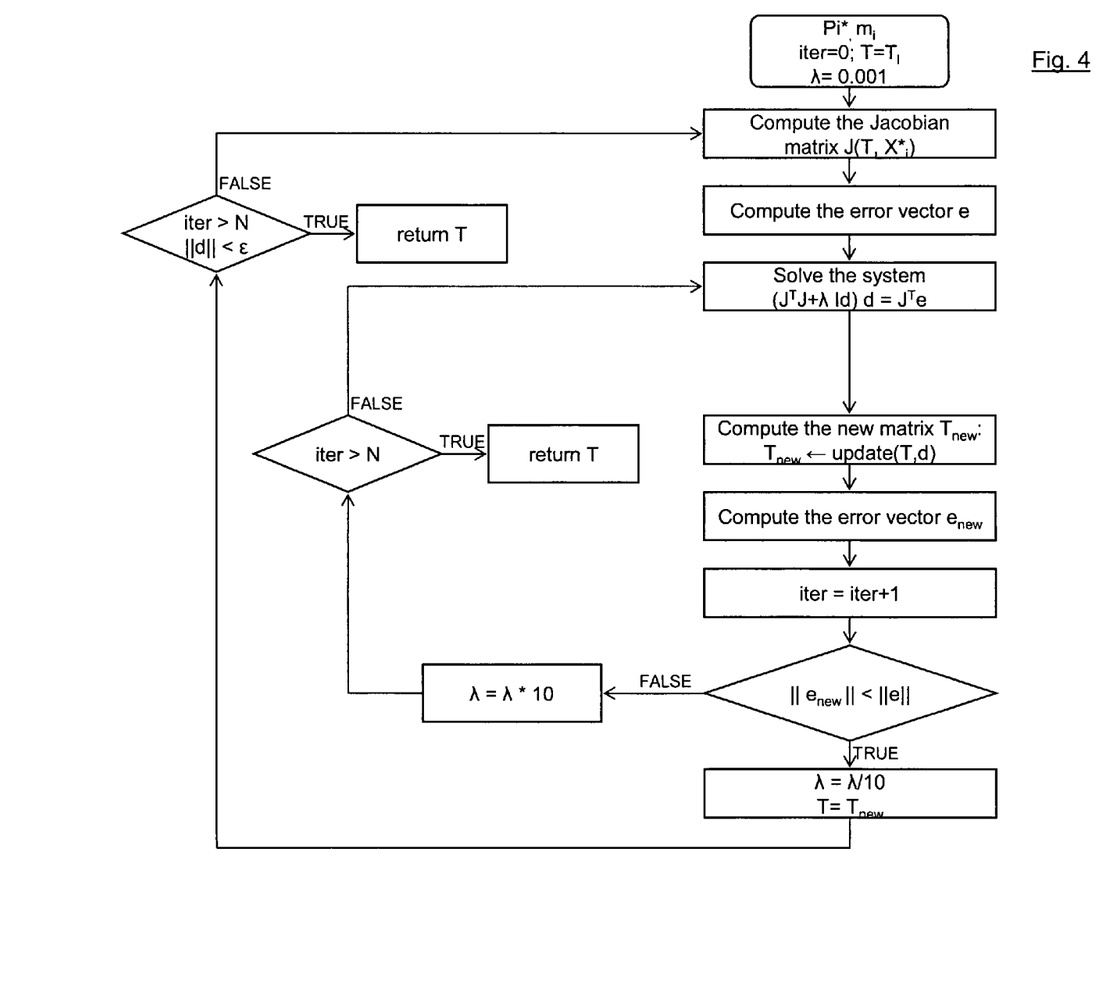
FIG. 4 shows a process according to the Levenberg-Marquardt algorithm adapted for determining a transformation matrix T which is appropriate for determination of the pose of the camera according to FIG. 1.
Figure 5:
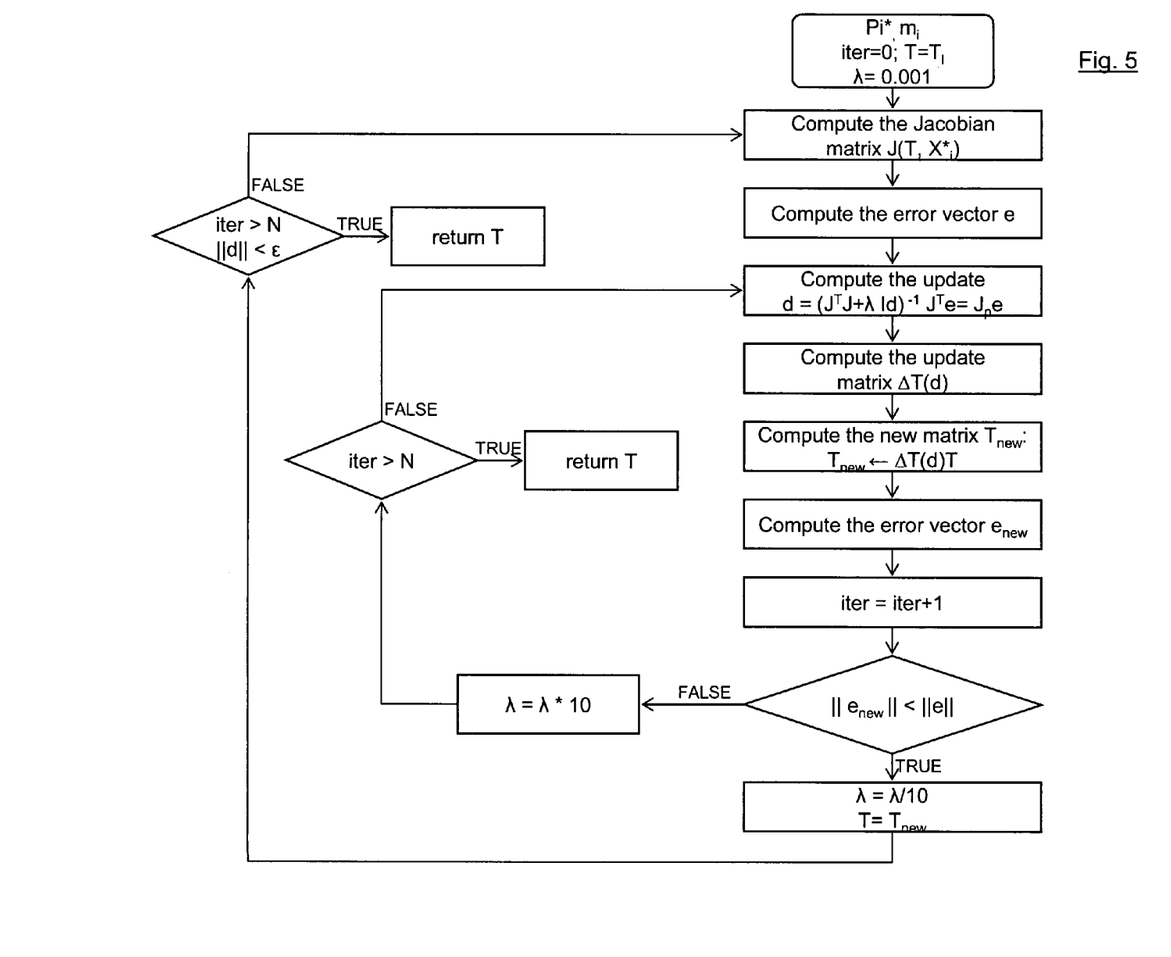
FIG. 5 shows a possible computational implementation of the process according to FIG. 4.

Similarly, a standard Levenberg-Marquardt implementation can be seen in FIG. 4, and one possible implementation is depicted in FIG. 5 where the update is solved using the pseudo-inverse and using a compositional approach.

Both algorithms iteratively update (refine) the pose estimation: T←update (T,d), where d is a (6×1) vector containing the 6 update parameters of the translation and the rotation and the update function depends on the parameterization chosen for d.

The Parameterization

Generally, the translation is parameterized using the natural $R^3$ parameterization. The 3 first entries of d represent the translation. However, for the rotation one can choose a parameterization based on the Euler angles or on the axis-angle representation or on the quaternion representation. Respectively, the 3 last entries of d are either the Euler angles or the axis-angle representation of the rotation. The vector d=[d1, d2, d3, d4, d5, d6] contains 3 entries for the translation [d1, d2, d3] and 3 entries for the rotation [d4, d5, d6].

When, the rotation is parameterized using quaternions, the vector d has 7 entries and the last 4 parameters represent the quaternion representation of the rotation. For example, in case we use Euler angles for parameterizing the rotation, we would have the matrix T in the following form $$T = \begin{bmatrix} \cos(d6)*\cos(d5) & -\sin(d6)*\cos(d4)+\cos(d6)*\sin(d5)*\sin(d4) & \sin(d6)*\sin(d4)+\cos(d6)*\sin(d5)*\cos(d4) & d1 \\ \sin(d6)*\cos(d5) & \cos(d6)*\cos(d4)+\sin(d6)*\sin(d5)*\sin(d4) & -\cos(d6)*\sin(d4)+\sin(d6)*\sin(d5)*\cos(d4) & d2 \\ -\sin(d5) & \cos(d5)*\sin(d4) & \cos(d5)*\cos(d4) & d3 \end{bmatrix}$$

One can use Lie Algebra parameterization. This parameterization is often used in the robotic community. The principles of parameterization, as described below, are known to the skilled person, and are described in the literature as follows:

In "Tracking people with twists and exponential Maps", Bregler and Malik, in IEEE Computer Society Conference on Computer Vision and Pattern Recognition (CVPR), Santa Barbara, Calif., pages 8-15, 1998; the above described parameterization was introduced for tracking people.

In "Real-Time Visual Tracking of Complex Structures", Tom Drummond and Roberto Cipolla, IEEE Transactions on Pattern Analysis and Machine Intelligence, vol. 24, no. 7, pages 932-946, July 2002 it was used for parameterizing increments in the context of edge based tracking.

Recently in "Motilal Agrawal, A Lie Algebraic Approach for Consistent Pose Registration for General Euclidean Motion", International Conference in Computer Vision, pages 1891-1897, 2005 it was used to register local relative pose estimates and to produce a global consistent trajectory of a robot.

When using this parameterization, the matrix T has the following form:

$$T = [\ R(d4, d5, d6) \quad t(d1, d2, d3, d4, d5, d6)\ ]$$
$$[\ 0 \quad 1\ ]$$

where the rotation matrix is written using the Rodriguez formula:

$$R(d4,d5,d6) = \mathrm{Id} + \sin(\theta)[u]_x + (1-\cos(\theta))[u]_x^2$$

$\theta$ is the angle of the rotation ($\theta = \|[\mathbf{d4},\mathbf{d5},\mathbf{d6}]\|$) and $[u]_x$ is the skew matrix of the rotation axis $u = [ux, uy, uz] = [\mathbf{d4},\mathbf{d5},\mathbf{d6}]/\theta$ $$[u]x = [\ 0 \quad -uz \quad uy\ ]$$
$$[\ uz \quad 0 \quad -ux\ ]$$
$$[\ -uy \quad ux \quad 0\ ]$$

The translation matrix depends on all the parameters of the update vector $$t(d1,d2,d3,d4,d5,d6) = (\mathrm{Id} + (1-\cos(\theta))[u]_x/\theta + (1-\sin(\theta)/\theta)*[u]_x^2)*[d1,d2,d3]$$

This parameterization has many advantages compared to the standard one (Euler Angles for the rotation and $R^3$ for the translation). One of the advantages that concerns this invention is that the Jacobian matrix (the derivative of the update matrix with respect to the update parameters d) has a very simple and cheap (in terms of computational costs) expression.

The update of the transformation matrix T

For every parameterization, one can either choose an additional update or a compositional update. The additional update builds an updated matrix T by adding the old parameters with the new parameters. The compositional update computes the updated matrix T as the multiplication between a matrix built with the update parameters $\Delta T(d)$ and the old matrix T. The update can then be written as:

$$T \leftarrow \Delta T(d)T$$

The different update methods are basically known to the skilled person and are described, for example, in: Lucas-Kanade 20 Years On: A Unifying Framework", Simon Baker and Iain Matthews, International Journal of Computer Vision, vol. 56, no. 3, pages 221-255, 2004 where the different possible updates are explained in the context of markerless tracking.

The Iterative Minimization Process

In every iteration, one transforms the reference 3D points Pi* with the estimated transformation matrix T (which in the first iteration is set to T1, as described above). One gets the equation $Pi = T\ Pi^* = [Xi,Yi,Zi,1]$.

Then, the obtained 3D points Pi are projected into a $me_i = [Xi/Zi, Yi/Zi]$. It is important to see that $me_i$ depends on the estimation of T.

For every correspondence, one computes $[e_{ix}, e_{ix}] = [xi,yi] - me_i$, where $[xi,yi]$ are the two first entries of the "normalized" point $m_i$ which was explained above.

Stacking all the correspondences together results into the geometric error vector, i.e. the vector $e = [e_{1x}, e_{1y}, e_{2x}, e_{2y}, \ldots e_{Nx}, e_{Ny}]$ where N is the total number of points.

The non-linear estimation iteratively minimizes the squared norm of this error vector.

For that, one also needs to compute the Jacobian matrix which is the first derivative of the $me_i$ with respect to the rotation and translation increments. The dimension of the Jacobian matrix is then (2N×6).

The lines 2*i and (2*i+1) of the Jacobian matrix can be written as: $\Delta(me_i)/\Delta d$ The Jacobian matrix can be computed numerically using the finite differences method. Alternatively, it can be computed analytically. For both approaches, the parameterization of the incremental matrix plays an important role in the complexity of the Jacobian computation. For example, in the case of a rotation update parameterized using the Euler angles, several trigonometric functions (e.g. cos and sin) need to be computed and recomputed at every iteration. The way of updating the estimate (additional or compositional) plays also an important role in the complexity of the algorithm.

Figure 6:
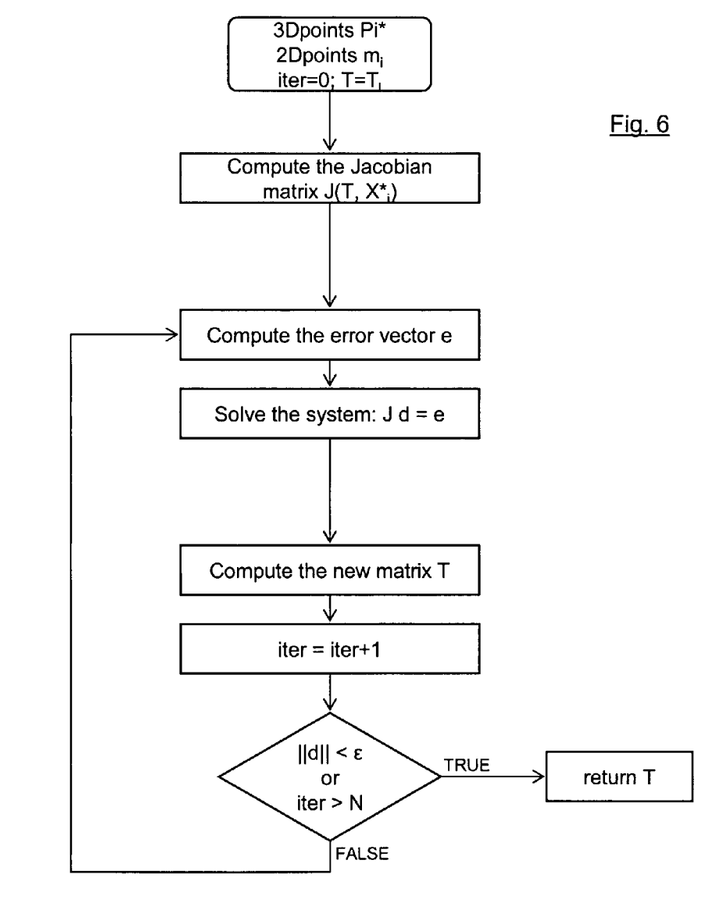
FIG. 6 shows a possible implementation of the Gauss-Newton algorithm for non-linear pose estimation where the Jacobian matrix is pre-computed and the update is done in a compositional fashion.

According to embodiments of the invention, the following considerations are made:

In FIG. 6, a possible implementation of the Gauss-Newton algorithm for non-linear pose estimation is shown where the Jacobian matrix is pre-computed after the initial step of determining the initial estimate of the transformation matrix T1 and the update is done in a compositional fashion. With respect to the standard process as shown in FIG. 3, according to this aspect of the invention the iteration process does not return to the (time consuming) computing of a new Jacobian matrix based on a new transformation matrix $T_{new}$, but returns to the step of computing the error vector e. According to the invention, keeping the Jacobian matrix fixed and not updating it during the iterative minimization process provides still very good results. The computed Jacobian matrix right after the linear solution of the transformation matrix T obtaining matrix T1 is a good approximation that allows to reach the minimum of the cost function with much lower computational power.

Figure 7:
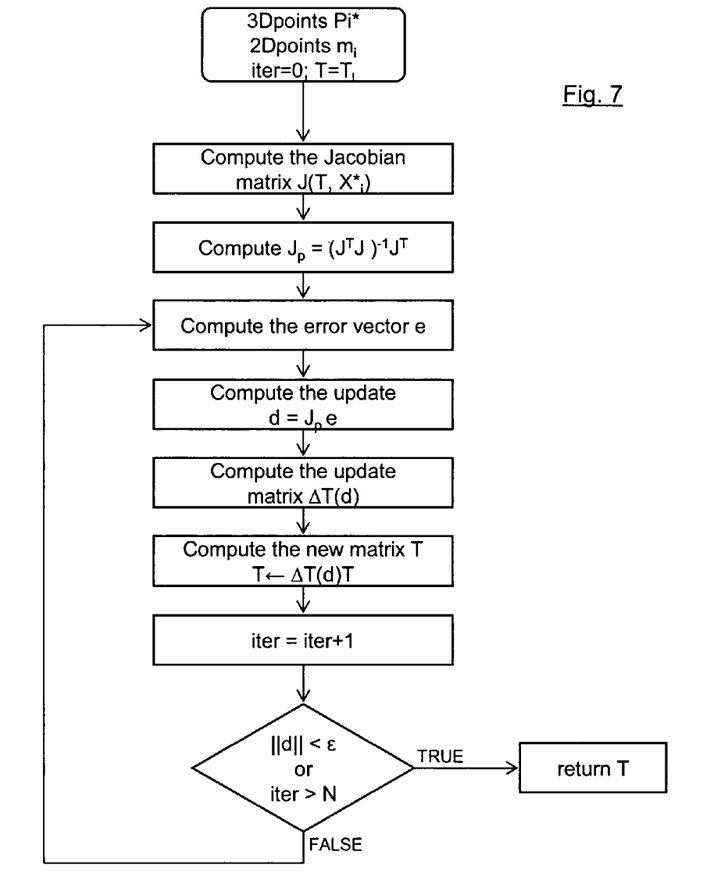
FIG. 7 shows a further possible implementation of the Gauss-Newton algorithm for non-linear pose estimation where the pseudo-inverse matrix is pre-computed as well.

In FIG. 7, it is shown that in case one uses the Gauss-Newton algorithm for non-linear pose estimation, if the update is solved using the pseudo-inverse $J_p$, the pseudo-inverse $J_p$ can be pre-computed as well. Therefore, with respect to the process of FIG. 6 the computational load in the iteration loop can be further decreased, particularly when solving the system J d=e in an efficient manner with using equation $d = J_p\ e$ and pre-computing $J_p$.

Figure 8:
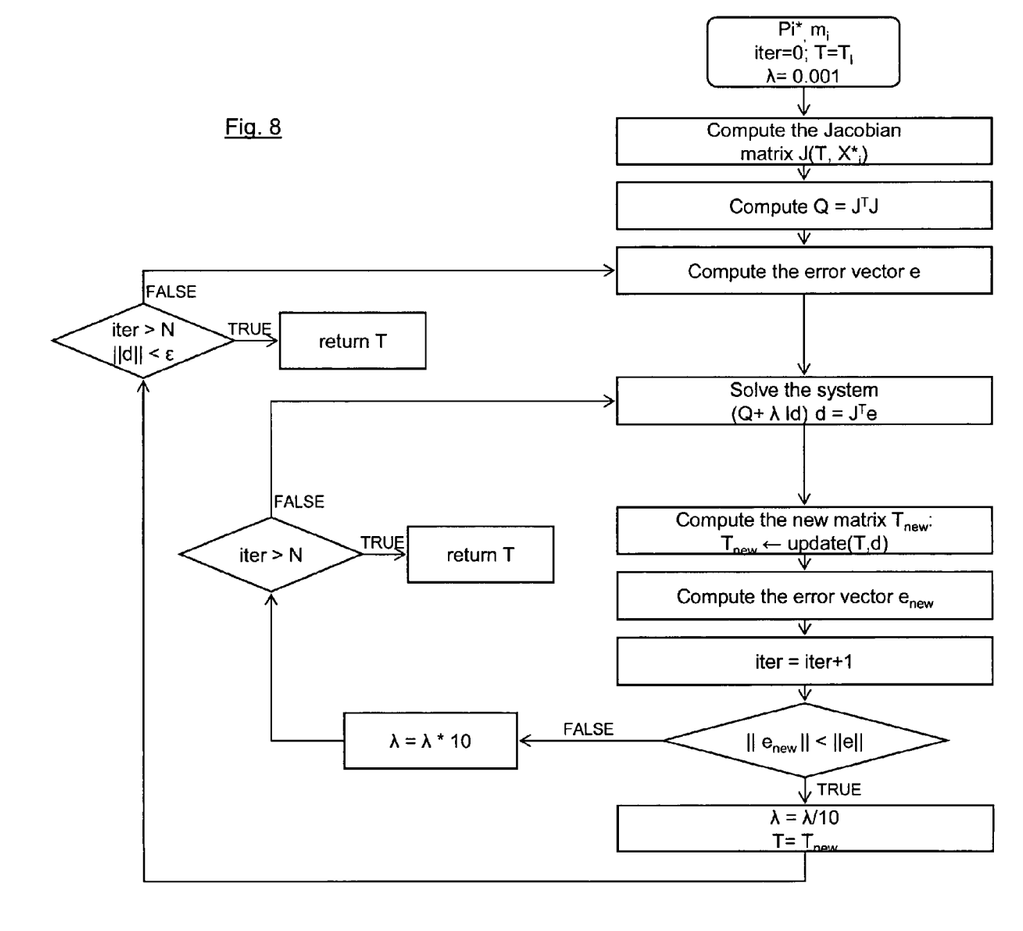
FIG. 8 shows a possible implementation of the Levenberg-Marquardt algorithm for non-linear pose estimation where the Jacobian matrix J and the matrix $J^TJ$ are pre-computed and the update is done in a compositional fashion.

In FIG. 8, a possible implementation of the Levenberg-Marquardt algorithm for non-linear pose estimation is shown where the Jacobian matrix J and the matrix $J^T J$ are pre-computed and the update is done in a compositional fashion. With respect to the standard process as shown in FIG. 5, according to this aspect of the invention the iteration process does not return to (time consuming) computing of a new Jacobian matrix based on a new matrix $T_{new}$, but returns to the step of computing the error vector e or the step of solving the system $(J^T J + \lambda \mathrm{Id})d = J^T e$, respectively. According to the invention, keeping the Jacobian matrix fixed and not updating it during the iterative minimization process provides still very good results.

Figure 9:
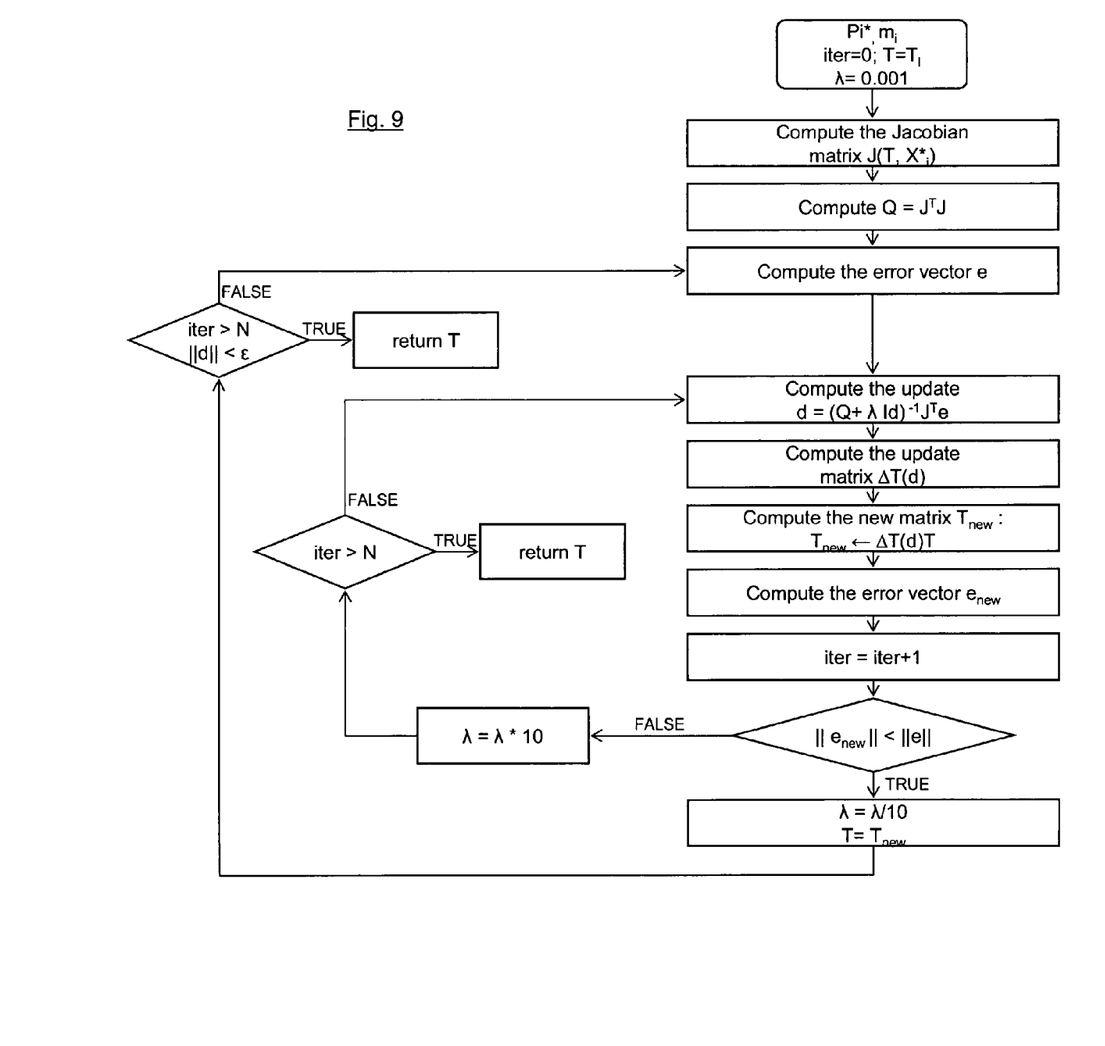
FIG. 9 shows a further possible implementation of the Levenberg-Marquardt algorithm for non-linear pose estimation where the Jacobian J and the matrix $J^TJ$ are pre-computed and the update is computed using the pseudo-inverse.

In FIG. 9, a possible implementation of the Levenberg-Marquardt algorithm for non-linear pose estimation is shown where, both, the Jacobian matrix J and the matrix $J^T J = Q$ are pre-computed and the update is computed using the pseudo-inverse. Therefore, with respect to the process of FIG. 5 the computational load in the iteration loop can be significantly decreased.

Figure 10:
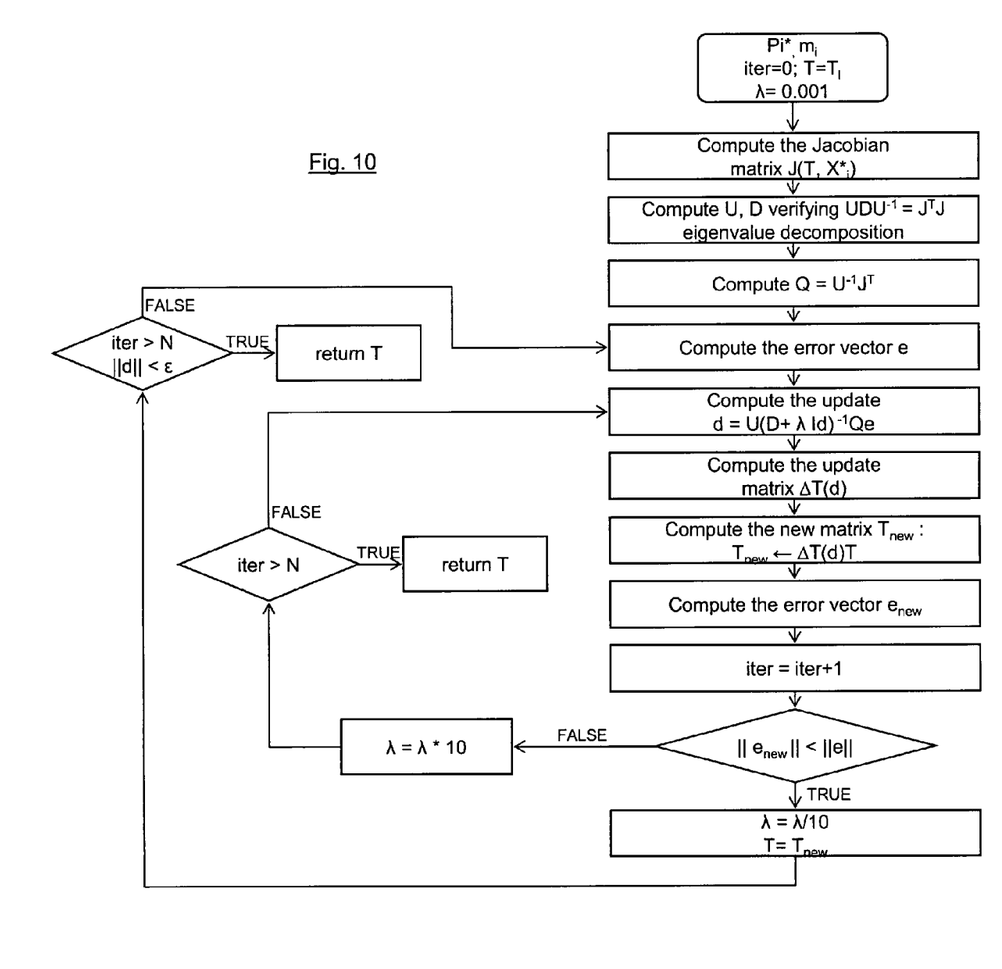
FIG. 10 shows a further possible implementation of the Levenberg-Marquardt algorithm for non-linear pose estimation where some more pre-computations have been done.

In FIG. 10, a possible implementation of the Levenberg-Marquardt algorithm for non-linear pose estimation is shown where the update is computed using the pseudo-inverse, where the Jacobian matrix J and the matrix $J^T J$ are pre-computed and the update is computed using the pseudo-inverse, and where some more pre-computations have been done (such as the eigenvalue decomposition of $J^TJ$, which is basically known to the person skilled in the art) in order to have a simpler matrix to inverse in the main loop.

According to aspects of the invention, a proper parameterization of the transformation matrix T may be chosen, wherein multiple kinds of parameterizations can be chosen. According to an embodiment, one decides to parameterize the matrix $\Delta T$ using the Lie Algebra se(3) associated to the Lie group SE(3) (see above).

The Jacobian computation complexity is then very much reduced. One gets a simple and an analytic expression of the Jacobian matrix. In addition, when using the compositional update approach, parts of the obtained Jacobian matrix can be pre-computed. This reduces the run-time processing. See the effect of such parameterization in the simplification of one Jacobian computation in the context of planar markerless tracking in: "Integration of Euclidean constraints in template based visual tracking of piecewise-planar scenes", Selim Benhimane and Ezio Malis, in Proceedings of the 2006 IEEE/RSJ International Conference on Intelligent Robots and Systems, October 9-15, pages 1218-1223, 2006, Beijing, China. The cost function error in this paper was based on photometric error between a reference template and current template. It was not based on geometric error as we are considering in this invention.

In addition to that, the non-linear estimation remains very time consuming and running it on hardware with very limited computational power, such as on mobile devices, makes it impossible to have the pose estimation to be performed in real-time especially with a very high number of points. According to the invention, with keeping the Jacobian matrix fixed and not updating it during the iterative minimization process (either using the Gauss-Newton method or using Levenberg-Marquardt method) provides still very good results. The computed Jacobian matrix right after the linear solution is a good approximation that allows reaching the minimum of the cost function with much lower computational power.

According to an embodiment of the invention, the different aspects as described above may also be combined in a method for determining the pose of a camera. For example, using both the Lie Algebra parameterization during a non-linear estimation based on a compositional update reduces the computational cost of the pose estimation problem. Using a fixed Jacobian matrix, as explained with respect to FIGS. 6-10, reduces the computational cost without deteriorating the result.

The method may be implemented in a computer program adapted to be loaded into the internal memory of a computer. Such computer may further include, e.g., a standard processor 2 as shown in FIG. 1 and may be coupled with a camera, such as camera 1 shown in FIG. 1, for taking images of a real environment. The computer program product having the computer program stored therein comprises software code sections by means of which the steps according to any of the aforementioned embodiments of the method according to the invention are performed when said program or product is running on said computer. In a further embodiment, the method may also be integrated or embedded in a chip used in connection with processing camera images. For example, such embedded chip may be coupled with or incorporated in the processor 2 or camera 1.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A method for determining the pose of a camera with respect to at least one real object, the method comprising the steps of:
   operating the camera for capturing a 2-dimensional image including at least a part of the real object;
   providing a transformation matrix (T) which includes information regarding a correspondence between 3-dimensional points (Pi*) associated with the real object and corresponding 2-dimensional points ($p_i$) of the real object as included in the 2-dimensional image;
   determining an initial estimate of the transformation matrix (Tl) as an initial basis for an iterative minimization process used for iteratively refining the transformation matrix;
   determining a Jacobian matrix (J) which includes information regarding the initial estimate of the transformation matrix (Tl) and reference values of 3-dimensional points (Pi*) associated with the real object;
   in the iterative minimization process, in each one of multiple iteration loops determining a respective updated version of the transformation matrix (T) based on a respective previous version of the transformation matrix (T) and based on the Jacobian matrix (J), wherein the Jacobian matrix is not updated during the iterative minimization process; and
   determining the pose of the camera with respect to the real object using the transformation matrix (T) determined at the end of the iterative minimization process.

2. The method of claim 1, wherein the iterative minimization process involves the algorithm of Gauss-Newton or the algorithm of Levenberg-Marquardt.

3. The method of claim 1, wherein the iterative minimization process involves a compositional update process in which the respective updated version of the transformation matrix (T) is computed from a multiplication between a matrix ($\Delta T(d)$) built with update parameters of the respective previous transformation matrix and the respective previous transformation matrix (T).

4. The method of claim 1, wherein the iterative minimization process involves the algorithm of Gauss-Newton, the iterative minimization process in each iteration loop comprising the steps of:
   determining an error vector e;
   determining an update vector d by solving the system: J d=e, with J being the Jacobian matrix; and
   determining a respective updated version of the transformation matrix based on a respective previous version of the transformation matrix at the beginning of the respective iteration loop and based on the update vector d;
   wherein after determining the respective updated version of the transformation matrix the iterative minimization process returns to determining a new error vector e based on the respective updated version of the transformation matrix.

5. The method of claim 4, wherein the update vector d is computed from: $d=(J^TJ)^{-1}J^Te=J_p e$ with $J_p$ being computed at the beginning of the iterative minimization process and kept fixed in multiple iteration loops during the iterative minimization process.

6. The method of claim 4, further comprising
determining an update matrix ΔT(d) using the update vector d,
wherein the update matrix ΔT(d) is parameterized using Lie Algebra.

7. The method of claim 6, wherein the update matrix ΔT(d) is parameterized using Lie Algebra se(3) associated to the Lie group SE(3).

8. The method of claim 1, wherein the iterative minimization process involves the algorithm of Levenberg-Marquardt, the iterative minimization process in each iteration loop comprising the steps of:
determining an error vector e;
determining an update vector d by solving the system: $(J^T J + \lambda \, Id) \, d = J^T e$, with J being the Jacobian matrix; and
determining a respective updated version of the transformation matrix based on a respective previous version of the transformation matrix at the beginning of the respective iteration loop and based on the update vector d;
wherein after determining the respective updated version of the transformation matrix the iterative minimization process returns to determining a new error vector e based on the respective updated version of the transformation matrix or determining a new update vector d.

9. The method of claim 8, wherein the update vector d is computed from: $d = (Q + \lambda \, Id)^{-1} J^T e$, with $Q = J^T J$ being computed at the beginning of the iterative minimization process and kept fixed in multiple iteration loops during the iterative minimization process.

10. The method of claim 1, wherein in the iterative minimization process Lie Algebra parameterization is used.

11. A method for determining the pose of a camera with respect to at least one real object, the method comprising the steps of:
operating the camera for capturing a 3-dimensional image including at least a part of the real object;
providing a transformation matrix (T) which includes information regarding a correspondence between 3-dimensional points (Pi*) associated with the real object and corresponding 3-dimensional points ($p_i$) of the real object as included in the 3-dimensional image;
determining an initial estimate of the transformation matrix (Tl) as an initial basis for an iterative minimization process used for iteratively refining the transformation matrix,
determining a Jacobian matrix (J) which includes information regarding the initial estimate of the transformation matrix (Tl) and reference values of 3-dimensional points (Pi*) associated with the real object;
in the iterative minimization process, in each one of multiple iteration loops determining a respective updated version of the transformation matrix (T) based on a respective previous version of the transformation matrix (T) and based on the Jacobian matrix (J), wherein the Jacobian matrix is not updated during the iterative minimization process; and
determining the pose of the camera with respect to the real object using the transformation matrix (T) determined at the end of the iterative minimization process.

12. The method of claim 11, wherein the iterative minimization process involves the algorithm of Gauss-Newton or the algorithm of Levenberg-Marquardt.

13. The method of claim 11, wherein the iterative minimization process involves a compositional update process in which the respective updated version of the transformation matrix (T) is computed from a multiplication between a matrix (ΔT(d)) built with update parameters of the respective previous transformation matrix and the respective previous transformation matrix (T).

14. The method of claim 11, wherein the iterative minimization process involves the algorithm of Gauss-Newton, the iterative minimization process in each iteration loop comprising the steps of:
determining an error vector e;
determining an update vector d by solving the system: $J \, d = e$, with J being the Jacobian matrix; and
determining a respective updated version of the transformation matrix based on a respective previous version of the transformation matrix at the beginning of the respective iteration loop and based on the update vector d;
wherein after determining the respective updated version of the transformation matrix the iterative minimization process returns to determining a new error vector e based on the respective updated version of the transformation matrix.

15. The method of claim 11, wherein the iterative minimization process involves the algorithm of Levenberg-Marquardt, the iterative minimization process in each iteration loop comprising the steps of:
determining an error vector e;
determining an update vector d by solving the system: $(J^T J + \lambda \, Id) \, d = J^T e$, with J being the Jacobian matrix; and
determining a respective updated version of the transformation matrix based on a respective previous version of the transformation matrix at the beginning of the respective iteration loop and based on the update vector d;
wherein after determining the respective updated version of the transformation matrix the iterative minimization process returns to determining a new error vector e based on the respective updated version of the transformation matrix or determining a new update vector d.

16. The method of claim 11, wherein in the iterative minimization process Lie Algebra parameterization is used.

17. A non-transitory computer program product adapted to be loaded into the internal memory of a computer, which is coupled with a camera for taking images of a real environment, and comprising software code sections by means of which the steps according to claim 1 are performed when said product is running on said computer.

18. A non-transitory computer program product adapted to be loaded into the internal memory of a computer, which is coupled with a camera for taking images of a real environment, and comprising software code sections by means of which the steps according to claim 11 are performed when said product is running on said computer.

* * * * *